Patented Sept. 7, 1943

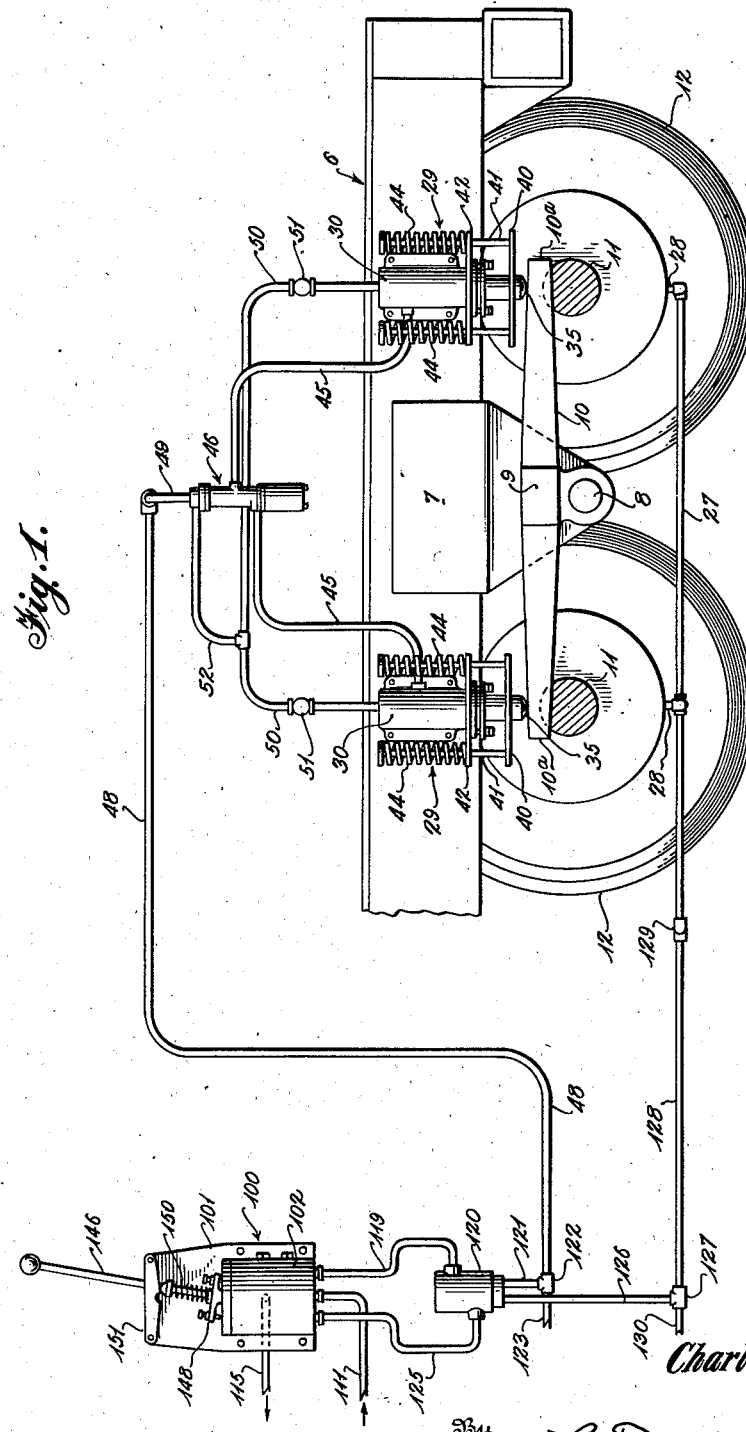

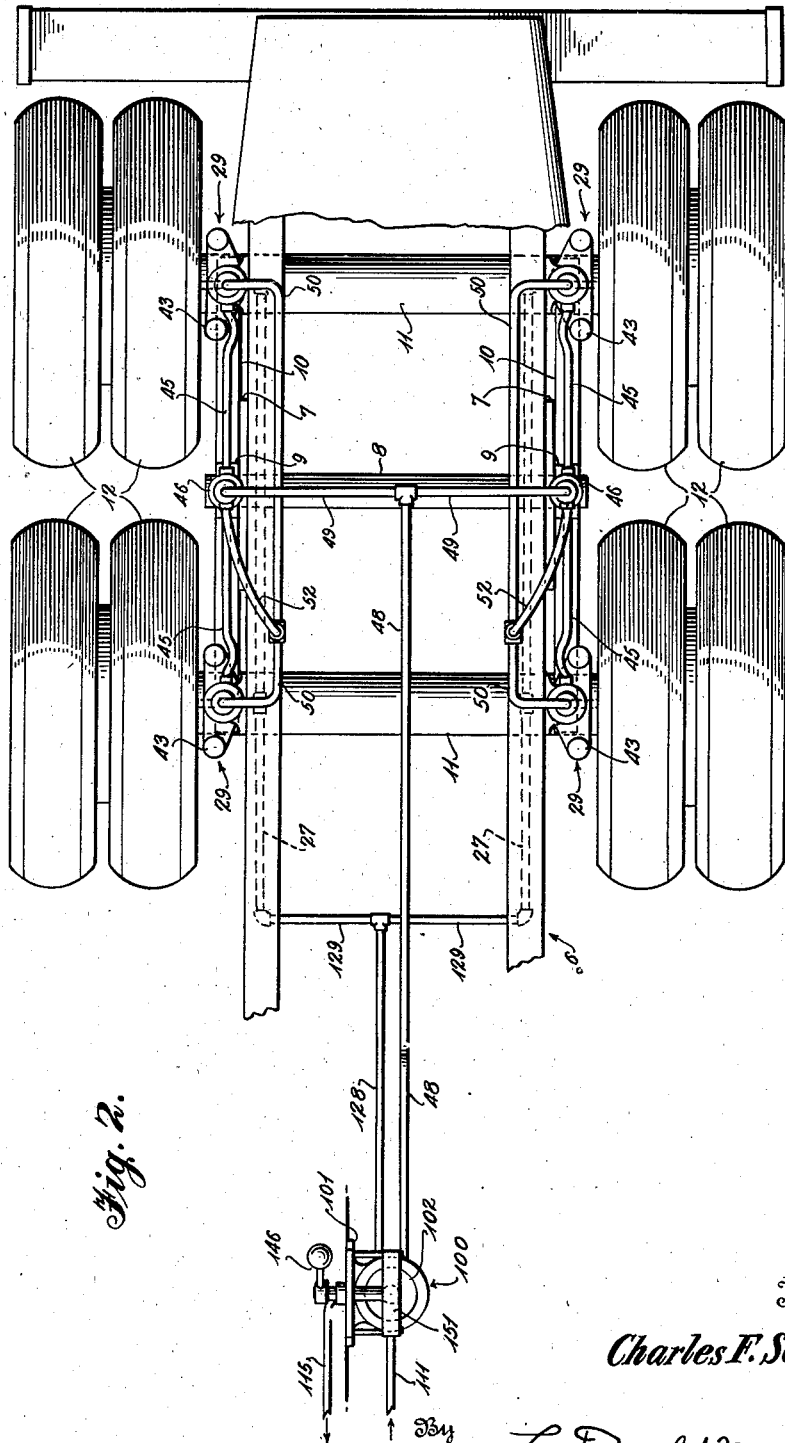

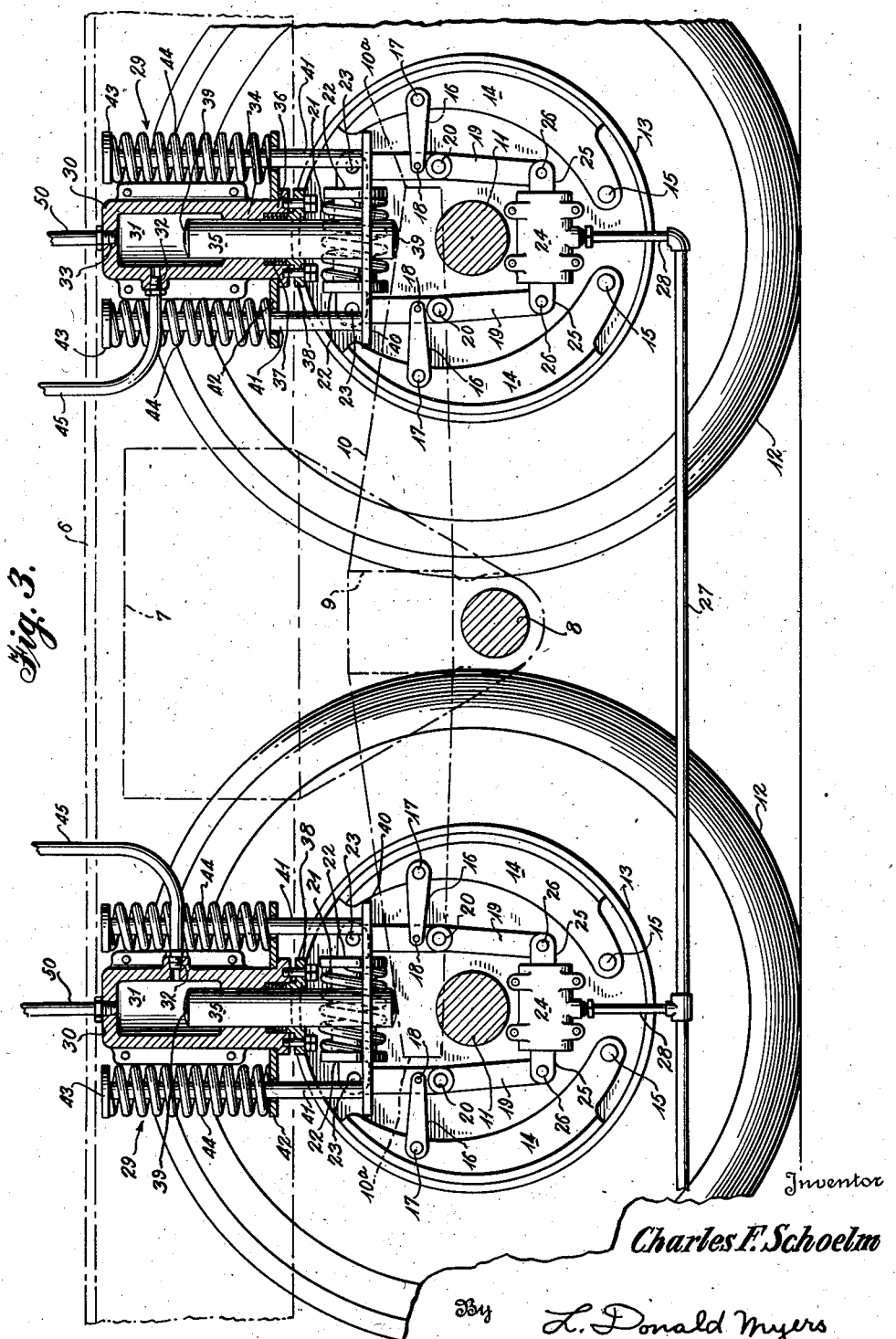

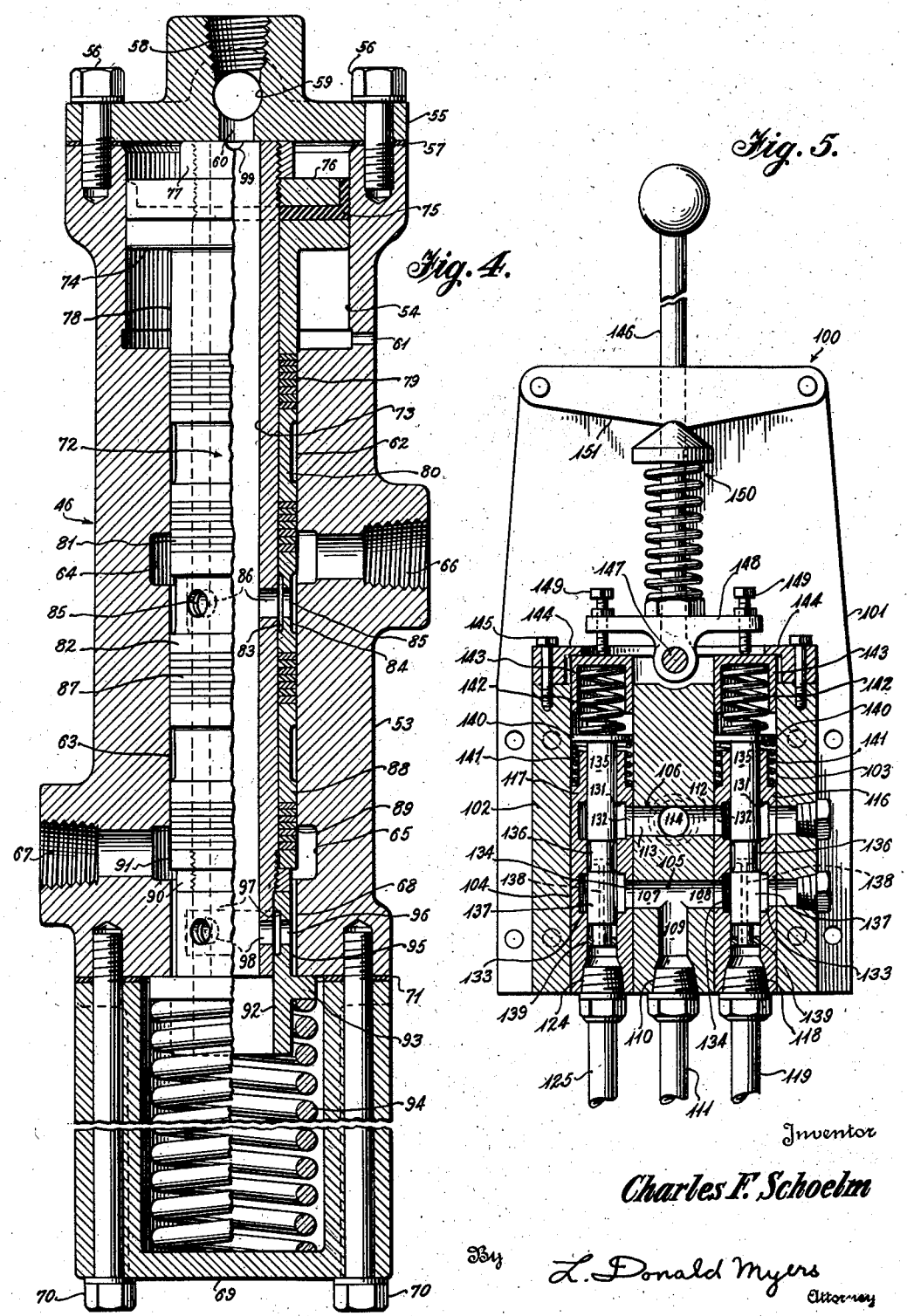

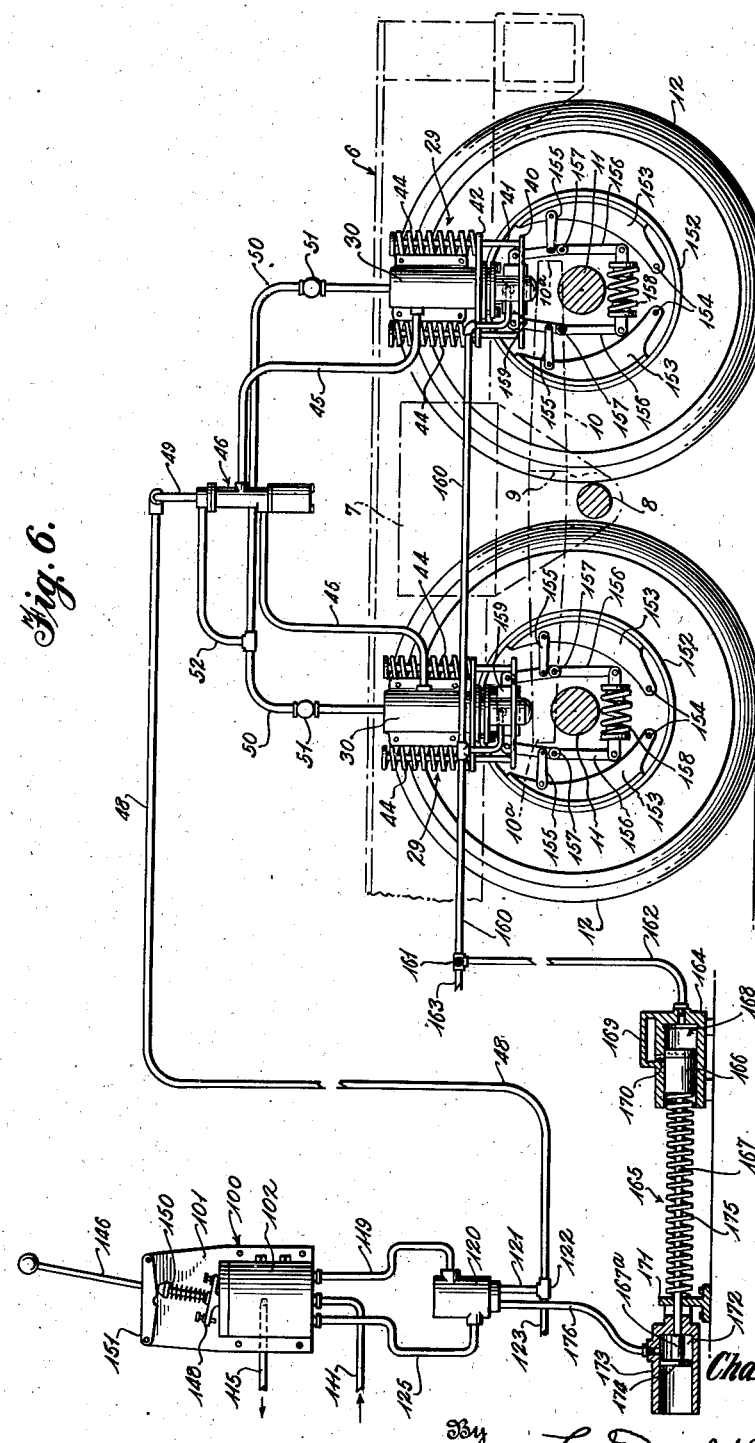

2,328,849

UNITED STATES PATENT OFFICE 2,328,849

VEHICLE STABILIZING MECHANISM

Charles F. Schoelm, Chicago, Ill., assignor to Link-Belt Speeder Corporation, a corporation of Illinois Application March 5, 1943, Serial No. 478,134

20 Claims. (Cl. 280—1)

This invention relates to new and useful improvements in vehicle stabilizing mechanism.

Heavy duty vehicles which are employed as the transportation mounts for erection and material handling equipment, such as cranes, are better adapted for performing their intended work if their running gear, or wheel and axle assemblies, are of sufficiently flexible construction to permit the vehicles to travel over rough ground as well as highways. Otherwise a relatively high percentage of certain types of jobs, which would fall well within the performance range of the equipment, would be unobtainable because of the inability of the transporting vehicles to travel to the locations of the jobs.

The more rugged, dependable wheel and axle assemblies used by such vehicles do not rely on springs to provide the desired degree of flexibility for travel. The principle of load equalizing beams centrally pivotally connected to the vehicle frame and having the ground engaging wheels suitably connected to their ends is used instead for both the front and rear assemblies. The load equalizing beam principle is carried out at the front end of such vehicles by directly pivotally connecting the center of the front axle to the vehicle frame. The wheels, of course, are connected to the ends of this axle-beam member by the conventional steering knuckle and wheel spindle mechanism. The rear end assemblies employ an equalizing beam on each side of the vehicle frame. These beams are centrally pivotally connected to the frame through the medium of a main drive axle and are suitably connected at their ends to the four single or dual wheels through the medium of two wheel axles which are positioned one in front of and one rearwardly of the aforesaid main axle.

Although the centrally pivoted equalizing beam type of connection between the vehicle frame and its wheels provides a substantially greater degree of stability than can be obtained when springs are used, it has been determined that heavy duty crane operations, for example, can be handled even more efficiently if still further stabilization is provided. This further increase can be obtained by employing stabilizing mechanism for rigidly anchoring or locking the ends of the beams to the vehicle frame. As such heavy duty operations are performed while the vehicle is at rest, the elimination of the flexibility for travel by stopping the pivotal action of the beams during such periods is not a disadvantage.

Rigidly anchoring or locking the ends of the equalizing beams to the vehicle frame, however, can create one problem which, if it is not properly dealt with, may cause serious damage to the vehicle frame, the equalizing beams and/or the anchoring means. This problem is present if it is possible for the operator to cause the vehicle to travel without first being compelled to free the equalizing beams from their anchoring or locking means.

It is a primary object of this invention to provide stabilizing mechanism for the running gear of heavy duty vehicles which will in no way interfere with or lessen their flexibility for travel while the vehicles are actually in motion, or in condition for motion, but which automatically will be rendered operative to prevent all flexing of the running gear whenever the vehicle is stopped and/or held stationary by the application of certain vehicle controls.

An important specific object of this invention is the provision of vehicle stabilizing mechanism which is automatically retracted and maintained in an inoperative condition, so as to interfere in no way with the flexibility of the running gear, whenever the stabilizing mechanism is not in use.

Another important specific object of the invention is to provide means for effecting application of and retraction of the vehicle stabilizing mechanism simultaneously with application of and release of the vehicle brakes so that no traveling of the vehicle will be permitted while the stabilizing mechanism is applied.

Other objects and advantages of the invention will be apparent during the course of the following description.

In the accompanying drawings forming a part of this specification and in which like numerals are employed to designate like parts throughout the same, Figure 1 is a side elevational view of the rear end portion of a vehicle frame with the stabilizing mechanism embodying this invention properly applied thereto, Figure 2 is a top plan view of the structure disclosed in Fig. 1, Figure 3 is an enlarged view, partly in vertical section and partly in side elevation, of the rear wheel and axle assembly of a vehicle with the stabilizing devices of the mechanism embodying this invention shown operatively associated with the brake mechanism of two wheels, Figure 4 is an enlarged vertical sectional view of a relay valve structure which is employed as a part of the equalizing mechanism, Figure 5 is an enlarged detail view, shown partly in elevation and partly in vertical section, of the operating valve shown in the illustrations of the mechanism presented by Figs. 1 and 2, and Figure 6 is a similar view to Fig. 1 but discloses a modification of the wheel brake applying mechanism which cooperates with the stabilizing mechanism.

In the drawings, wherein for the purpose of illustration is shown the preferred embodiments of this invention, and first particularly referring to Figs. 1 and 2, the reference character 6 designates in its entirety a vehicle frame having running gear to which the stabilizing mechanism embodying this invention is applied. Each side of the vehicle frame has suitably connected thereto a bracket or plate 7 which may be of any construction suitable for properly supporting the main rear drive axle 8. Each end portion of this main rear axle has pivotally connected thereto a suitable attachment member 9 which is employed for pivotally connecting a suitable equalizing beam 10 to the end of the main axle. The opposite ends of each one of the equalizing beams 10 have slidably and pivotally connected thereto the parallel wheel axles 11 which are arranged one forwardly of and one rearwardly of the main drive axle 8. It will be appreciated that no attempt has been made to disclose details of the bracket or plate 7 for each side of the vehicle frame, the main rear drive axle 8, the attachment members 9, the equalizing members 10, and the wheel axles 11 with the connections between these various elements. This type of rear axle assembly is conventional in the art and is provided to permit the wheel axles 11 to rise and fall relative to the vehicle body or frame 6 and the main rear axle 8. The wheel axles 11, also, are permitted to tip or tilt; i. e., partake of angular movements about axes extending longitudinally of the vehicle frame so that either end portion of either wheel axle may independently rise or fall with respect to its normal position. The connections between the end portions 10a of the equalizing beams 10 and the wheel axles 11 must be particularly constructed to permit these desired movements of the wheel axles so that the wheels 12, suitably journaled on the end portions of the axles 11, may independently follow or adapt themselves to irregularities in the surface over which the vehicle travels.

Referring next to Fig. 3 of the drawings, there is disclosed a conventional form of fluid brake mechanism. This mechanism includes a suitable brake drum 13 for each one of the rear wheels 12. Of course, when dual wheels are provided, like those shown in Fig. 2, the inner wheel of each dual assembly is the only one which is provided with the brake drum 13. Two conventional brake shoes 14 are provided for each brake drum. These shoes are pivotally mounted at their lower ends on the pins 15. A link 16 is provided for each brake shoe and a pivotal connection 17 is provided between each link and its shoe. The inner end of each link 16 is pivotally connected at 18 to a lever 19 which is pivotally supported at 20.

The brake shoes 14 are normally applied, or caused to have braking engagement with the inner surface of their drum 13, by the compression spring 21 which bears at its opposite ends against the combined plug and apertured connector members 22 which are connected at 23 to the upper ends of the levers 19. It will be appreciated that when these springs 21 are permitted to expand, they will cause the levers 19 to pivot about their supports 20 for forcing the brake shoes 14 radially outwardly in opposite directions against the brake drum 13. A conventional cylinder 24, which is open at its opposite ends, is provided for each pair of brake shoes. Opposed pistons, not shown in detail, are positioned in each cylinder 24 and are provided with projecting rods 25 for pivotal connection at 26 to the lower ends of the levers 19. Pressure fluid is delivered by the pipe line 27 to the branch lines 28 for delivery to the cylinders 24 at points intermediate the ends of said cylinders and in the space provided between each pair of opposed pistons. When this pressure fluid is admitted to the cylinder 24 of each wheel, the two pistons of that cylinder are caused to move away from each other for spreading the lower ends of the associated levers 19. This pivotal action of a pair of levers causes the associated compression spring 21 to be further compressed and causes the two brake shoes 14 to be moved inwardly toward each other and out of braking engagement with their drum 13. From this description of the braking mechanism for the wheels shown in Fig. 3, it will be appreciated that the brake shoes will be normally applied by the compression springs 21 and the shoes will only be released, or out of braking engagement with their drums, when fluid pressure is built up in the cylinders 24. Therefore, this fluid pressure must be provided in the cylinders 24 when the vehicle is traveling and should the fluid pressure fail at any time, accidentally or otherwise, the springs 21 will automatically apply the brakes.

The mechanism so far described is conventional heavy duty truck construction and has been illustrated for the purpose of showing how the equalizing mechansm is associated therewith and how the said mechanism particularly cooperates with the equalizing beam principle of flexibly mounting the vehicle body on the ground engaging wheels and with the brake mechanism for said wheels. The manner in which the stabilizing mechanism cooperates with the equalizing beams is illustrated in connection with the rear wheel and axle assembly for the vehicle frame 6 but it is considered that persons skilled in the art will readily appreciate how this stabilizing mechanism will just as readily cooperate with a front axle-beam assembly.

Referring next to Figs. 1, 2 and 3, it will be seen that a stabilizer device 29 is provided for each connection between an end portion 10a of an equalizing beam 10 and an end portion of a wheel axle 11. In other words, two such stabilizing devices 29 are mounted on each side of the vehicle frame 6. When rendered operative, these stabilizing devices function to prevent upward movement of their respective equalizing beam end portions and wheel axle end portions. Therefore, the rendering of all four stabilizing devices operative simultaneously will anchor or lock the four ends of the two equalizing beams 10 and the four ends of the two wheel axles 11 to the vehicle frame. When the equalizing beams 10 are free to pivot about their supporting main rear axle 8, the tipping point of the vehicle frame 6, as a whole, is about the main rear axle 8. However, when the four stabilizing devices 29 are placed in operation for anchoring or locking the equalizing beams against pivotal movement, the tipping point of the vehicle frame, as a whole, is transferred to the wheel axle 11 that is located rearwardly of the main drive axle 8. This transfer of the tipping point of the vehicle, naturally, increases the length of the wheel base for the vehicle and naturally increases the stability of the vehicle. This increase in stability has been found to be extremely desirable when the vehicle is employed as a transportation mount for a heavy duty crane, or the like.

Figs. 1 and 3 clearly disclose the construction of the stabilizing devices 29. As all of these devices are alike, one detail description will be considered as applying to each one of the same. The stabilizing device includes a cylinder 30 which is rigidly attached to the side of the vehicle frame 6. This cylinder is provided with a fluid pressure chamber 31. A tapped side hole 32 and a tapped top hole 33 are provided for threaded connections with certain tubes that will be referred to at a later point. The lower end portion of the cylinder body is cored at 34 to slidably accommodate the piston 35 and is further cored at 36 to accommodate the packing rings 37 which are held in place and properly compressed by means of the packing gland ring 38. The piston 35 preferably is formed from solid steel rod of suitable diameter. The solid construction of these pistons permits the opposite ends 39 to be rounded. By rounding both ends of the piston, it can be reversibly associated with its cylinder. It is desirable to have the lower projecting end of the piston rounded for engagement with the associated end portion 10a of the equalizer beam 10.

A transverse bar 40 is suitably anchored to the lower end portion of the piston 35. The opposite end portions of this bar 40 have suitably attached thereto the rods 41 which extend upwardly along the opposite sides of the cylinder 30 through guiding plate 42. The upper ends of these rods 41 are headed at 43 to engage the upper ends of the compression springs 44. These springs also bear against the guide plate 42 at their lower ends.

Figs. 1 and 3 disclose the stabilizing devices 29 in their operative conditions; i. e., with their pistons 35 extended to engage the associated ends of the equalizing beam 10. With the pistons extended in this manner for all of the stabilizer devices, both of the equalizing beams 10 will be anchored or locked to the vehicle frame 6 against pivotal movement relative to supporting main rear axle 8. The various pistons 35 of the stabilizer devices 29 are extended into their equalizer beam locking positions by the development of suitable fluid pressure within the cylinder chambers 31. When the pistons are extended by such fluid pressure, the springs 44 are compressed. When the fluid pressure is exhausted from the cylinder chambers 31, the springs 44 will retract the pistons 35 of the various stabilizer devices 29 with the result that the projecting ends of the stabilizer pistons 35 will not engage the ends of the equalizer beams 10 and will not interfere in any way with the desired movement of the equalizer beams while the vehicle is in motion.

The fluid pressure necessary to cause the pistons 35 to be extended or projected from the lower ends of the cylinders 30, and against the force of the springs 44, is delivered to the cylinder chambers 31 through the feed tubes 45 which are suitably connected to the cylinders 30 by the tapped holes 32. These tubes 45 are shown in Figs. 1 and 2 as extending to the relay valve units 46. Fig. 2 discloses one of these relay valves for each side of the vehicle frame 6. These relay valve devices 46 are supplied with pressure fluid through the feed pipe 48 and its branches 49 which extend respectively to the upper ends of the two relay valves. The fluid pressure is also exhausted from the cylinder chambers 31 through the same tubes 45, pipes 48 and 49 and the valve units 46 when the latter are conditioned for this reverse flow.

It will be seen when the detail features of construction of the relay valve units 46 are described in connection with the disclosure of Fig. 4 that when fluid pressure is developed in the stabilizer device cylinders 30 the fluid charges are locked or trapped in the cylinders until they are intentionally released or vented from the cylinders. To take care of any seepage or leakage while the fluid charges are locked in the cylinders 30, branch tubes 50 are connected to the upper ends of the cylinders by the tapped holes 33. These branch tubes are each provided with a check valve 51 which will prevent return flow of the fluid. The branch tubes 50 for each side of the vehicle are connected to a common supply tube 52 which is connected to the upper end portion of the relay valve device 46. This supply tube 52 is constantly in communication with the branch feed pipe 49 for each relay valve device so that whenever the pressure fluid is present in the main feed pipe 48 and the branch pipes 49, it will be available for replenishing fluids in all of the cylinders 30.

Before describing in detail the mechanism that is employed for controlling the delivery of pressure fluid to the relay valve units 46 and their pairs of stabilizer device cylinders 30, it is believed to be advisable to describe in detail the construction of each one of the relay valve devices 46. These two devices are of identical construction so that a detail description of one will suffice for both. One of these relay valves is disclosed in detail in Fig. 4.

This valve includes a tubular body or casting 53 which is of hollow construction and is open at its opposite ends. The upper end of this body casting is cored at 54 to provide a cylinder. This cylinder is substantially closed at its upper end by the cap 55 which is held in place by the screws 56. A packing gasket 57 is interposed between the end of the body casting 53 and the cap 55. The cap is provided with the two right angularly arranged tapped holes 58 and 59 which communicate with each other at their inner ends. A duct 60 leads from the connecting ends of the holes 58 and 59 into the cylinder 54 of the body casting. The tapped hole 58 is provided for threaded connection with a branch feed pipe 49 while the tapped hole 59 is provided for connection with the end of the tube 52, see Figs. 1 and 2. A bleed opening 61 is provided for the inner end of the cylinder 54.

The body casting 53 is further cored to provide the guide portions 62 and 63 as well as the feed chambers 64 and 65. The feed chambers 64 and 65 communicate with tapped holes 66 and 67 respectively which are provided for connection with the fluid pressure feed tubes 45 that extend to the tapped openings 32 of the stabilizer device cylinders 30. The lower open end of the body casting 53 is cored at 68 and is of substantially the same diameter as the cored portions 62 and 63. This lower end of the body casting is closed by the cup 69 that is held in place by the screws 70. A packing gasket 71 is interposed between the mating end surfaces of the body casting 53 and the cup 69.

This hollow construction of the body casting 53 is provided to accommodate a double piston valve assembly 72 which functions to control the flow of pressure fluid from the chambers 64 and 65 into the two feed tubes 45. The construction of this piston type valve assembly will now be given. This valve assembly includes a main tubular body 73 which extends the full length of the assembly and is open at its opposite ends. The upper end of this tube has positioned thereon the piston 74 which is received within the cylinder 53. This piston is packed by the cup leather 75 which is held in place by the ring 76 and the nut 77. This piston 74 includes a sleeve portion 78 which extends a desired distance along the body tube 73. Positioned at the inner end of the piston sleeve 78 is a series of packing rings 79 which is followed by a filler sleeve 80. A second series of packing rings 81 is positioned next to the filler sleeve 80. A sleeve 82 follows the set of packing rings 81. This sleeve is reduced in thickness intermediate its ends to provide the inner and outer annular recesses 83 and 84. A suitable number of ports 85 are spaced around this reduced portion for establishing communication between the recesses 83 and 84. The body tube 73 is also provided with a series of ports 86 which preferably should register with the ports 85 formed in the filler sleeve 82. The annular recess 83, however, will function to establish communication between the ports 85 and 86 even though these ports do not register.

Below the ported sleeve 82, the body tube 73 has mounted thereon a series of packing rings 87, a filler sleeve 88, and a second series of packing rings 89 in the order named. Below the second series of packing rings, the body tube 73 has threaded thereon a nut 90 while a ring 91 is interposed between this nut and the adjacent one of the series of packing rings 89. By means of the nuts 77 and 90, the piston 74, the various series of packing rings 79, 81, 87 and 89, and the sleeves 80, 82 and 88 are maintained properly assembled on the body tube 73.

Below the nut 90, the body tube 73 has positioned thereon a sleeve 92 which projects beyond the lower open end of the body casting 53 and into the end cup 69. A flange 93 is formed exteriorly on this sleeve 92 for bearing against the lower end face of the body casting 53 and for bearing against the upper end of a compression spring 94. This compression spring is housed within the cup 69 and bears at its lower end against the closed end wall of the cup. The portion of the sleeve 92 located above or inwardly of the flange 93 is of less diameter than the cored portion 68 of the body casting 53 to provide an annular flow chamber 95. This upper portion of the sleeve 92 is provided with an annular series of ports 96 which provide communication between the annular flow chamber 95 and the internal annular recess 97 that is formed in the sleeve 92. The lower end portion of the body tube 73 is also provided with an annular series of ports 98 which preferably should register with the ports 96 of the sleeve 92. However, the annular recess 97 will provide communication between these ports 96 and 98 if the said ports do not remain in register with each other.

If fluid pressure is caused to build up in the bore of the body tube 73, the pressure fluid will flow into the space afforded between the upper face of the piston 74 and the inner face of the cap 55 through a suitable number of radial grooves 99 which are provided in the upper ends of the body tube 73 and the nut 77.

Let us now consider that the pistons 35 of the stabilizing devices 29 are retracted into their cylinders 30 by the springs 44 and as a result of the absence of any piston operating fluid pressure in the chambers 31 of the several cylinders 30. When pressure fluid is caused to flow through the feed pipe 48, it reaches both of the relay valve devices 46 by way of the branch feed pipes 49. This pressure fluid flows into the tapped holes 58 of the relay valve devices 46 and through the duct 60 into the bore of each body tube 73. From these body tubes the fluid flows through the ports 86 and 85 and the annular recesses 84 into the chambers 64. The fluid in each body tube 73 also flows through the ports 98 into the annular groove 97 of the sleeve 92 and then through the ports 96 into the annular space 95 from which it flows into the fluid chamber 65 of each relay valve device. The fluid in the chambers 64 and 65 of the two relay valves then flows through the tubes 45 into the chambers 31 of the several stabilizer device cylinders 30. The delivery of pressure fluid to these chambers 31 will build up fluid pressure in the latter sufficient to cause the pistons 35 to move outwardly, against the force of their springs 44, into engagement with the end portions 10a of the equalizer beams 10. The fluid pressure developed in the cylinder chambers 31, of course, should not be sufficient to elevate the body relative to any point of connection between an equalizing beam end 10 and its associated wheel axle end portion. Of course, this elevation of the vehicle body cannot occur as long as the fluid pressures developed in the several cylinder chambers 31 are substantially the same.

After the pistons 35 of the several stabilizer devices 29 have been moved into engagement with their respective ends of the equalizing bars 10, the fluid pressure will build up back through the tubes 45 and in the bore of each body tube 73. This building up of pressure within the bore of each body tube will cause the pressure fluid to flow into the upper end of the cylinder 54 of each relay valve device 46. The development of fluid pressure above the pistons 74 of the relay valves will cause these pistons and their body tubes 73 to move downwardly against the force of the springs 94. Downward movement of a body tube 73 will cause its series of packing rings 81 to move into a position for closing off the bore of the body tube from the fluid chamber 64. The downward movement of the body tube 73, also, will cause the series of packing rings 89 to move downwardly for closing off the fluid chamber 65 from the bore of the body tube. This closing of the chambers 64 and 65 of both relay valve devices 46 will cause the pressure fluid in the several tubes 45 and the several cylinder chambers 31 to be trapped or locked therein with the result that the pistons 35 will be locked in their projected positions.

The pressure fluid will be locked in the cylinders of the various stabilizer devices 29 until the application of fluid pressure to the feed pipe 48 is stopped and the fluid is permitted to flow out of this feed pipe. When the feed pipe 48 is vented, or connected to any suitable discharge line, the spring 94 of each one of the relay valve devices 46 will overpower the fluid pressure in the cylinders 54 above their pistons 74 and the body tubes 73 with their associated elements will be returned to the position illustrated in Fig. 4. This return movement of the body tubes 73 will re-establish communication between the bores of these tubes and the chambers 64 and 65. The springs 44 of the several stabilizer devices 29 then will retract the pistons 35. This inward movement of the pistons will displace the pressure fluid from their cylinder chambers 31. This displaced fluid will flow through the tubes 45 into the chambers 64 and 65 and from these chambers into the body tube bores and thence into the branch feed pipes 49 and the main feed pipe 48.

Figs. 1, 2 and 5 disclose a master control or operating valve 100 which is employed by the operator of the vehicle to effect the desired application of fluid pressure to the various stabilizing devices 29 and the brake shoe releasing cylinders 24. The construction of this master valve can best be explained in connection with the disclosure afforded by Fig. 5.

This master valve includes a suitable mounting plate or bracket 101 to which is suitably secured a valve body 102. This valve body is suitably cored to provide the two parallel, main bores 103 and 104 and the two intermediate, right angularly arranged, T-shaped ducts 105 and 106. The duct 105 has branches 107 and 108 which extend in opposite directions to the main bores 104 and 103 respectively. A third branch 109 extends to a tapped opening 110 which provides a connection for the pressure fluid supply tube 111. The duct 106 has two oppositely directed branches 112 and 113 which communicate with the main bores 103 and 104 respectively. This duct 106 has a third branch 114 which is connected to the return or discharge line 115, see Figs. 1 and 2.

The main bores 103 and 104 have positioned therein the sleeves 116 and 117 respectively. The sleeve 116 is threaded at its lower end 118 for connection with the tube 119 which extends to a suitable joint or coupling member 120 for connection with the tube 121. A T-coupling 122 connects this tube 121 to the feed pipe 48 that extends to the branch pipes 49 of the relay valve devices 46. This coupling 122 also connects the tube 121 to the feed pipe 123 which extends to the stabilizing devices, not shown, which are associated with the opposite end portions of the front axle-beam for the front wheels. It has not been considered necessary to disclose this front axle assembly and its stabilizing mechanism because persons skilled in the art will readily understand that the front axle will be stabilized in the same manner as either one of the rear equalizing beams 10.

The sleeve 104 has its lower threaded end 124 connected to the tube 125 which also extends to the coupling member 120 for connection with the tube 126. This tube 126 is connected by the T-coupling 127 to the feed pipe 128 that extends to the branch pipes 129 which are connected at their outer ends to the pipes 27 that lead to the branch pipes 28 of the brake cylinders 24. The coupling 127 also connects the tube 126 to the pipe 130 which leads to the brakes for the front wheels.

It probably will be advisable to point out at this time that the disclosure of the fluid pipes 27, 28, 128 and 129 at such a low level with respect to the ground is merely for the purpose of avoiding confusion or to provide a clearer disclosure. These pipes will not be located in this impractical manner in an actual commercial embodiment. Also, suitable lengths of flexible tubing, or the like, will be provided in the flow path of the fluid to the brakes to permit the rear wheels to partake of their desired independent movements.

Each one of the sleeves 116 and 117 is provided with an enlarged chamber 131 which is in transverse alignment with the T-shaped duct 106. These chambers have ports 132 which communicate with the branches 112 and 113 of the ducts 106. These sleeves 116 and 117 also are provided with the enlarged chambers 133 that are in transverse alignment with the branches 107 and 108 of the ducts 105. These chambers have ports 134 which provide communication between the chambers 133 and the said branches 107 and 108.

The bore of each one of the sleeves 116 and 117 has slidably positioned therein a piston type of valve body 135 which is reduced in diameter intermediate its ends, or at 136. Each one of the piston portions 137 has a longitudinally extending passage 138 formed therein which opens at its upper end into the annular space provided by the reduced valve body portion 136 and which opens at its lower end into the space provided below the lower end of the said valve body 135. A sleeve 139 is secured in each one of the sleeves 116 and 117 and slidably receives the lower end portion of its piston 135 to act as a dash pot to prevent piston vibrations.

The upper end of each valve body 135 is provided with a flange or abutment 140 which acts as a seat for the compression spring 141. The lower end of each one of these springs bears against a suitable shoulder formed by its associated sleeve 116 or 117. These flanges or abutments 140 cooperate with the upper ends of the sleeves 116 and 117 to limit downward movement of the valve bodies 135. The valve bodies are returned to the positions illustrated in Fig. 5 by the compression springs 141.

The upper end of each of the valve bodies 135 has bearing thereagainst a spring 142 which is partially enclosed within a cap 143. A stop ring 144 overlies these spring caps 143 for limiting upward movement of the caps. This ring 144 is attached to the valve body casting 102 by a suitable number of screws 145.

An operating lever 146 is mounted at its lower end on a shaft 147. This shaft also carries a rocker arm 148 which has adjustably mounted on its opposite ends the screws 149. These screws engage the caps 143 of the respective valve bodies 135 and function to alternately depress these caps and move the valve bodies 135 downwardly when the operating shaft 147 is rocked in oppoiste directions by the lever 146. It will be noted that this type of connection between the operating lever 146 and the two valve bodies 135 will permit only one valve body to be depressed or moved downwardly at any time. When the rocker arm 148 is moved to depress one of the valve bodies 135, the second valve body will be restrained against vertical upward movement by its spring 142 and the engagement of the spring cap 143 with the stop ring or collar 144.

A spring pressed latch or detent 150 cooperates with the notched keeper 151 for holding the operating lever 146 in the neutral position illustrated in Fig. 5, the stabilizer device and brake operating or applying position illustrated in Figs. 1 and 2, and the brake releasing position, not shown, which is opposite to the applying position illustrated in Figs. 1 and 2.

The operations of this master control valve for effecting simultaneous application of all of the stabilizer devices 29 and all of the brakes as well as simultaneous release of all of the stabilizing devices and all of the brakes now will be described.

When the master control valve operating lever 146 is in the neutral position illustrated in Fig. 5, the pressure fluid will not be permitted to flow from the supply tube 111 through the duct 105 into the tubes 119 or 125 that lead to the stabilizing devices 29 and the brake cylinders 24 respectively. When no pressure fluid is delivered to the cylinders 30 of the several stabilizer devices, the pistons 35 of these devices are retracted. When no pressure fluid is delivered to the brake cylinders 24, the brake shoe operating springs 21 will cause the brake shoes to be applied. Therefore, when the operating lever 146 is in its neutral position the brakes will be applied and the stabilizing devices will be retracted or inoperative.

When the operating lever 146 is moved into the position illustrated in Figs. 1 and 2, the rocker arm 148 will partake of clockwise movement, as viewed in Figs. 1 and 5, for depressing the valve body 135 which is associated with the sleeve 116. This valve body will be moved downwardly until its flange 140 engages the upper end of the sleeve 116. This downward movement of the valve body will cause the reduced portion 136 of this body to be placed in communication with the enlargement 133 of the sleeve 116. The pressure fluid then will be permitted to flow from the tube 111 through the branches 108 and 109 of the duct 105 and through the port 134 into the chamber 133 of this sleeve 116. This fluid will flow through the ducts 138 of the depressed valve body 135 into the tube 119. From this tube the pressure fluid will flow through the path afforded by the elements 120, 121, 122, 48 and 49 into the relay valve devices 146. It has been explained above how the delivery of pressure fluid to the relay valve devices will effect operation or application of the four stabilizer devices 29. The stabilizer devices will continue to function to prevent movement of the equalizing beams 10 as long as the operating lever 146 remains in the position illustrated in Figs. 1 and 2. When the operating lever is in this illustrated position, no fluid flows from the supply line 111 into the tube 125 and from this tube through the various connected elements to the brake cylinders 24. Therefore, the springs 121 will apply the brake shoes 114.

When the operator desires to release the stabilizing devices and the brakes so that the vehicle body 6 may be moved to a new location, the operating lever 146 is moved to the other side of the neutral position illustrated in Fig. 5. This movement of the operating lever causes the rocker arm 148 to move in a counter-clockwise direction, as viewed in Figs. 1 and 5.

This movement of the rocker arm permits the spring 141 to return the valve body 135, associated with the sleeve 116, to its normal position with the spring cap 143 in engagement with the stop collar or ring 144. When this valve body 135 is in its normal position, flow of fluid through the branch 108 of the duct 105 will be stopped. The fluid pressure that remains in the tube 119 will cause the valve body 135 to be moved or displaced upwardly so that the reduced portion 136 of this valve body will communicate with the chamber 131 of the valve sleeve 116. The pressure fluid in the tube 119, therefore, will be permitted to flow out through this chamber 131 into the duct branch 112 by way of the port 132. From the branch 112 of the duct 116, the fluid will be permitted to flow into the return or venting tube 115 by way of the branch 114 of the duct 106.

The rocking of the arm 148 in the counter-clockwise direction causes the valve body 135 for the sleeve 117 to be depressed. The pressure fluid then will be permitted to flow from the supply tube 111 through the branches 109 and 107 of the duct 105 and in the previously described manner to the tube 125. From this tube the pressure fluid will flow through the elements 126, 127, 128, 129, 27 and 28 into the brake cylinders 24. The fluid in these brake cylinders will bring about operation of the levers 119 for moving the brake shoes 114 away from their drums 13. Therefore, when the master control valve operating lever 146 is moved all the way to the left, as viewed in Figs. 1 and 5, the brakes for all of the wheels will be released and the stabilizing devices 29 will be retracted or rendered inoperative.

When the operator of the vehicle again desires to stop at a new location and effect application of the wheel brakes and the several stabilizing devices, the master control valve operating lever 146 is again returned to the position illustrated in Figs. 1 and 2.

The neutral position of the control lever 146 shown in Fig. 5 is only employed when the vehicle is at rest and the work performing equipment carried by the vehicle is not in use.

Fig. 6 discloses a modification of the brake actuating mechanism that cooperates with the stabilizing devices. In the form of the invention shown in Figs. 1 to 5 inclusive, the brakes for the various wheels are applied by springs that are individual to the separate brakes and each wheel brake mechanism is provided with a fluid pressure motor that operates to retract the brake shoes when pressure fluid is delivered by the motor. With this type of mechanism, the brakes for the several wheels may not be uniformly applied, to provide equal braking pressure on all of the wheels, because of differences in force developed by the separate brake shoe applying springs. The brake operating mechanism of the modification shown in Fig. 6 overcomes this possible disadvantage by employing a separate motor for each brake mechanism with these separate fluid motors functioning to expand or apply the brake shoes rather than to retract the brake shoes. These separate fluid motors for the different brake mechanisms, however, are all simultaneously and equally provided with pressure fluid as a result of operation of a single master actuating motor. This brake actuating mechanism will assure the application of uniform braking pressure on all of the wheels.

The structure shown in Fig. 6 embodies the same main axle 8 which is directly connected to the vehicle frame 6, the same equalizing beams 10 which are pivotally connected to the main drive axle 8, the same two wheel axles 11 which are slidably and pivotally connected to the end portions 10a of the equalizing beams 10, and the same stabilizing devices 29 that are provided for the ends of the equalizing beams 10. The stabilizing devices 29 of the Fig. 6 structure are all simultaneously actuated by the same pressure fluid control system which includes the relay valve devices 46, the master control or operating valve 100, and the proper piping for interconnecting the said valves and the stabilizing devices. Therefore, the same reference characters will be employed in Fig. 6 for identifying the various elements which are the same in both embodiments of the invention. The brake mechanisms and their actuating means, however, will be specifically described in connection with the disclosure of Fig. 6.

Each one of the ground engaging wheels 12 is provided with a suitable brake drum 152. Each one of these brake drums has operatively associated therewith two conventional brake shoes 153 which are pivotally mounted at their lower ends on the pins 154. Each one of these brake shoes has pivotally connected to its upper end portion a link 155. The outer or free ends of these links are pivotally connected to the levers 156 above their pivotal supports 157.

A compression spring 158 is connected between the lower ends of the pair of levers 156 provided for each pair of brake shoes 153. These springs 158 normally function to retract the brake shoes 153, or move them out of braking engagement with their drum 152. A double piston type of fluid pressure motor 159 has its opposed pistons pivotally connected to the upper ends of the brake shoe actuating levers 156. These fluid pressure motors 159 are connected in parallel to the pipe 160 which is employed for delivering pressure fluid to the cylinders. One of these pipes 160 is provided for the pair of fluid pressure motors 159 arranged at each side of the vehicle frame 6. These two parallel pipes 160 are interconnected at the coupling 161 which in turn is connected to a single pressure fluid supply pipe 162. The coupling 161 additionally has connected thereto a pipe line 163 which is intended to extend to the brake mechanisms for the two front wheels, not shown, of the vehicle.

The pressure fluid delivery pipe 162 is connected to the fluid pressure developing cylinder 164 of the brake actuating master motor which is designated in its entirety by the reference character 165. The fluid pressure developing cylinder 164 has mounted therein a piston 166 which has connected thereto a piston rod 167. The pressure developing chamber 168 of the cylinder 164, the pipe members 160, 162 and 163, and the fluid pressure motors 159 for all of the brake mechanisms are intended to be filled with pressure fluid so that movement of the piston 166 through the cylinder 164 will vary the pressure developed in the fluid motors 159. That is to say, when the piston 166 is moved to the right, as viewed in Fig. 6, pressure will be developed uniformly in all of the fluid pressure motors 159 for equally applying all of the brakes and when the piston 166 is moved to the left, the pressure is reduced in the various motors 159 so that the springs 158 can operate to retract the brake shoes 153. To maintain the brake applying fluid system filled with the pressure fluid, a supply reservoir 169 is provided and is connected to the chamber 168 of the cylinder 164 through the port 170. This supply reservoir 169 is only diagrammatically illustrated.

The aforementioned piston rod 167 slidably passes through a bracket 171 and then passes into the chamber 172 of the fluid actuating cylinder 173 which forms a part of the master brake actuating motor 165. This piston rod is connected to a piston 174 that is slidably positioned within the cylinder 173. This cylinder is suitably attached to and supported by the bracket 171. A compression spring 175 encircles the piston rod 167 and bears at its opposite ends against the outer face of the piston 166 and the adjacent side of the bracket 171.

A pipe line 176 communicates at one end with the chamber 172 of the cylinder 173 and is connected at its outer end to the coupling member 120 for connection with the tube 125 which extends from the valve body 102. This coupling 120, tube 125 and valve body 102 has been fully described in connection with the form of the invention shown in Figs. 1 to 5 inclusive. The pipe 176, therefore, will be supplied with pressure fluid through the valve body 102 whenever the valve operating lever 146 is moved to the left of its neutral position. The neutral position of this operating lever has been previously described as being illustrated in Fig. 5. When pressure fluid is delivered to the chamber 172 of the cylinder 173, the piston 174 is moved to the left, as viewed in Fig. 6. This movement of the piston 174 compresses the spring 165 because the piston rod 167, connected to the piston 174, moves the piston 166 outwardly of the pressure developing cylinder 164. This outward movement of the piston 166, as has been described above, reduces the pressure in the fluid motors 159 and releases the various brake shoes 153 with respect to their drums 152.

When the valve actuating lever 146 occupies either its neutral position or the position illustrated in Fig. 6, the supply of fluid pressure to the tube 125, the pipe 176, and the chamber 172 of the cylinder 173 can be exhausted through the valve body 102 and its return or discharge line 115. When the valve device 102 is conditioned for exhausting the pressure fluid from the chamber 172 of the cylinder 173, the compressed spring 165 will function to move the piston rod 167 and the two pistons 166 and 174 to the right for increasing the pressure of the fluid in the chamber 168 of cylinder 164. This increase in pressure in the chamber 168 will bring about application of all of the brake mechanisms for the several wheels of the vehicle. It will be appreciated, therefore, that whenever the fluid pressure is sufficiently reduced in the chamber 172 of cylinder 173, either through proper operation of the valve device 102 or as a result of failure of fluid pressure in the delivery line 111 leading to the valve 102, the brakes for the several wheels will be applied by operation of the spring 165. The mechanism of Fig. 6 is illustrated with the stabilizing devices 29 in operation and with the brakes of the several wheels applied.

The piston rod 167 has a portion 167a located in the chamber 172 of cylinder 173 which is of increased diameter so as to function as a stop for limiting the movement of piston 174 to the right in its cylinder 173 and under the influence of the compression spring 175. This stop 167a, therefore, functions to prevent the piston 174 from moving into a position where it will close or seal the connection between the pipe 176 and the cylinder chamber 172.

It is to be understood that the form of this invention herewith shown and described is to be taken as the preferred example of the same, and that various changes in the shape, size, and arrangement of parts may be resorted to without departing from the spirit of the invention and the scope of the subjoined claims.

Having thus described the invention, I claim:

1. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, means for normally restraining each stabilizing device against operation, brakes for said wheels, means for normally applying said brakes, fluid pressure actuated means for effecting operation of said stabilizing devices against the action of their restraining means, fluid pressure actuated means for effecting release of said brakes, a source of fluid under pressure, and means for alternately effecting application of fluid pressure from said source to the fluid pressure actuated means for the stabilizing devices and the brakes.

2. Vehicle stabilizing mechanism, comprising a vehicle frame, a main axle on which the frame is supported, a pair of wheel axles positioned one on each side of the main axle, an equalizing beam on each side of the vehicle frame for pivotally connecting the end portions of the main axle to the adjacent end portions of the wheel axles, wheels journaled on the wheel axles, a separate stabilizing device for each end portion of each one of the wheel axles operable to prevent vertical movement of said end portions, means for normally restraining each stabilizing device against operation, brakes for said wheels, means for normally applying said brakes, fluid pressure actuated means for effecting operation of said stabilizing devices against the action of their restraining means, fluid pressure actuated means for effecting release of said brakes, a source of fluid under pressure, and means for alternately effecting application of fluid pressure from said source to the fluid pressure actuated means for the stabilizing devices and the brakes.

3. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, spring powered means for normally restraining each stabilizing device against operation, brakes for said wheels, spring powered means for applying said brakes, fluid pressure actuated means for effecting operation of said stabilizing devices against the action of their restraining means, fluid pressure actuated means for effecting release of said brakes, a source of fluid under pressure, and means for alternately effecting application of pressure fluid from said source to the fluid pressure actuated means for the stabilizing devices and the brakes.

4. Vehicle stabilizing mechanism, comprising a vehicle frame, a main axle on which the frame is supported, a pair of wheel axles positioned one on each side of the main axle, an equalizing beam on each side of the vehicle frame for pivotally connecting the end portions of the main axle to the adjacent end portions of the wheel axles, wheels journaled on the wheel axles, a separate stabilizing device for each end portion of each one of the wheel axles operable to prevent vertical movement of said end portions, spring powered means for normally restraining each stabilizing device against operation, brakes for said wheels, spring powered means for normally applying said brakes, fluid pressure actuated means for effecting operation of said stabilizing devices against the action of their restraining means, fluid pressure actuated means for effecting release of said brakes against the action of their applying means, a source of fluid under pressure, and means for alternately effecting application of pressure fluid from said source to the fluid pressure actuated means for the stabilizing devices and the brakes.

5. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, each stabilizing device including a first portion attached to the vehicle frame to move therewith and a second portion supported by the first portion for movement into and out of an operative position in which it prevents vertical movement of its wheel axle end portion, means for yieldably holding the second portions of the stabilizing devices out of their operative positions, brakes for said wheels, means for normally applying said brakes, fluid pressure actuated means for moving the second portions of the stabilizing devices into their operative positions, fluid pressure actuated means for effecting release of said brakes, a source of fluid under pressure, and means for alternately effecting application of fluid pressure from said source to the fluid pressure actuated means for the stabilizing devices and the brakes.

6. Vehicle stabilizing mechanism, comprising a vehicle frame, a main axle on which the frame is supported, a pair of wheel axles positioned one on each side of the main axle, an equalizing beam on each side of the vehicle frame for pivotally connecting the end portions of the main axle to the adjacent end portions of the wheel axles, wheels journaled on the wheel axles, a separate stabilizing device for each end portion of each one of the wheel axles operable to prevent vertical movement of said end portions, each stabilizing device including a first portion attached to the vehicle frame to move therewith and a second portion supported by the first portion for movement into and out of an operative position in which it prevents vertical movement of its wheel axle end portion, means for yieldably holding the second portions of said stabilizing devices out of their operative positions, brakes for said wheels, means for normally applying said brakes, fluid pressure actuated means for moving the second portions of the stabilizing devices into their operative positions, fluid pressure actuated means for effecting release of said brakes, a source of fluid under pressure, and means for alternately effecting application of fluid pressure from said source to the fluid pressure actuated means for the stabilizing devices and the brakes.

7. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, each stabilizing device including a first portion attached to the vehicle frame to move therewith and a second portion supported by the first portion for movement into and out of an operative position in which it prevents vertical movement of its wheel axle end portion, spring powered means for yieldably holding the second portions of said stabilizing devices out of their operative positions, brakes for said wheels, spring powered means for normally applying said brakes, fluid pressure actuated means for moving the second portions of the stabilizing devices into their operative positions, fluid pressure actuated means for effecting release of said brakes against the action of their applying means, a source of fluid under pressure, and means for alternately effecting application of fluid pressure from said source to the fluid pressure actuated means for the stabilizing devices and the brakes.

8. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, each stabilizing device including a cylinder attached to the vehicle frame to move therewith and a piston movable relative to the cylinder into and out of a position in which it prevents vertical movement of its wheel axle end portion, means for yieldably holding the pistons out of their operative positions, brakes for said wheels, means for normally applying said brakes, fluid pressure actuated means including said cylinders and pistons for moving the pistons out of said positions, fluid pressure actuated means for effecting release of said brakes, a source of fluid under pressure, and means for alternately effecting application of fluid from said source to the fluid pressure actuated means for the stabilizing devices and the brakes.

9. Vehicle stabilizing mechanism, comprising a vehicle frame, a main axle on which the frame is supported, a pair of wheel axles positioned one on each side of the main axle, an equalizing beam on each side of the vehicle frame for pivotally connecting the end portions of the main axle to the adjacent end portions of the wheel axles, wheels journaled on the wheel axles, a separate stabilizing device for each end portion of each one of the wheel axles operable to prevent vertical movement of said end portions, each stabilizing device including a cylinder attached to the vehicle frame to move therewith and a piston movable relative to the cylinder into and out of a position in which it prevents vertical movement of its wheel axle end portion, means for yieldably holding the pistons out of said positions, brakes for said wheels, means for normally applying said brakes, fluid pressure actuated means including said cylinders and pistons for moving the pistons of the stabilizing devices into said positions, fluid pressure actuated means for effecting release of said brakes, a source of fluid under pressure, and means for alternately effecting application of fluid pressure from said source to the fluid pressure actuated means for the stabilizing devices and the brakes.

10. Vehicle stabilizing mechanism, comprising a vehicle frame, a main axle on which the frame is supported, a pair of wheel axles positioned one one each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, means for normally restraining each stabilizing device against operation, brakes for said wheels, means for normally applying said brakes, fluid pressure actuated means for effecting operation of said stabilizing devices against the action of their restraining means, fluid pressure actuated means for effecting release of said brakes against the action of their applying means, a source of fluid under pressure, piping for connecting the source of fluid under pressure to the said fluid pressure actuated means, and a valve device in said piping for alternately effecting application of pressure fluid from said source to the fluid pressure actuated means for the stabilizing devices and the brakes so that the fluid pressure actuated means for the stabilizing devices will effect their operation as the brakes are applied and so that the fluid pressure actuated means for the brakes will effect their release as the stabilizing devices are restrained from operation.

11. Vehicle stabilizing mechanism, comprising a vehicle frame, a member pivotally connected to the frame intermediate its ends, a cylinder attached to the frame at each end of said member, a piston for each cylinder and movable by fluid pressure developed in the cylinder into engagement with the associated end of the pivoted member, means associated with each cylinder and piston for normally yieldably holding the piston in a retracted position, a ground engaging wheel supporting each end of the pivoted member, a brake mechanism for each wheel, means for applying the brakes for the wheels, fluid motor means for the brake mechanisms operable to release the latter, a source of fluid under pressure, piping for connecting said fluid source to the cylinders and the fluid motor means, and a master valve device in said piping for alternately effecting application of pressure fluid from said source to the cylinders and to the fluid motor means so that the pistons will be projected by fluid pressure when the brakes are applied by their means and so that the brakes will be released by fluid pressure when the pistons are retracted by their yieldable means.

12. Vehicle stabilizing mechanism, comprising a vehicle frame, a member pivotally connected to the frame intermediate its ends, a cylinder attached to the frame at each end of said member, a piston for each cylinder and movable by fluid pressure developed in the cylinder into engagement with the associated end of the pivoted member, means associated with each cylinder and piston for normally yieldably holding the piston in a retracted position, a ground engaging wheel supporting each end of the pivoted member, a brake mechanism for each wheel, means for normally yieldably applying the brakes for the wheels, fluid motor means for the brake mechanisms operable to release the latter, a source of fluid under pressure, piping for connecting said fluid source to the cylinders and the fluid motor means, a master valve device in said piping for alternately effecting application of pressure fluid from said source to the cylinders and to the fluid motor means so that the pistons will be projected by fluid pressure when the brakes are applied by their yieldable means and so that the brakes will be released by fluid pressure when the pistons are retracted by their yieldable means, and a relay valve device also in said piping for trapping the fluid in the cylinders while the master valve is conditioned to effect application of fluid pressure to the cylinders.

13. Vehicle stabilizing mechanism, comprising a vehicle frame, a member pivotally connected to the frame intermediate its ends, a cylinder attached to the frame at each end of said member, a piston for each cylinder and movable by fluid pressure developed in the cylinder into engagement with the associated end of the pivoted member, spring powered means associated with each cylinder and piston for normally yieldably holding the piston in a retracted position, a ground engaging wheel supporting each end of the pivoted member, a brake mechanism for each wheel, spring powered means for applying the brakes for the vehicle, fluid motor means for the brake mechanisms operable to release the latter, a source of fluid under pressure, piping for connecting said fluid source to the cylinders and the fluid motor means, and a master valve device in said piping for alternately effecting application of pressure fluid from said source to the cylinders and to the fluid motor means so that the pistons will be projected by fluid pressure when the brakes are applied by their spring powered means and so that the brakes will be released by fluid pressure when the pistons are retracted by their spring powered means.

14. Vehicle stabilizing mechanism, comprising a vehicle frame, a member pivotally connected to the frame intermediate its ends, a cylinder attached to the frame at each end of said member, a piston for each cylinder and movable by fluid pressure developed in the cylinder into engagement with the associated end of the pivoted member, means associated with each cylinder and piston for normally yieldably holding the piston in a retracted position, a ground engaging wheel supporting each end of the pivoted member, a source of fluid under pressure, piping for connecting the fluid source with the cylinders, and a master valve for effecting flow of fluid through the piping to the cylinders to develop the piston projecting fluid pressure in the cylinders.

15. Vehicle stabilizing mechanism, comprising a vehicle frame, a member pivotally connected to the frame intermediate its ends, a cylinder attached to the frame at each end of said member, a piston for each cylinder and movable by fluid pressure developed in the cylinder into engagement with the associated end of the pivoted member, means associated with each cylinder and piston for normally yieldably holding the piston in a retracted position, a ground engaging wheel supporting each end of the pivoted member, a source of fluid under pressure, piping for connecting the fluid source with the cylinders, a master valve for effecting flow of fluid through the piping to the cylinders to develop the piston projecting fluid pressure in the cylinders, and a relay valve device also in said piping operable as a result of developing said fluid pressure in the cylinders for trapping the pressure fluid in the cylinders to hold the pistons projected.

16. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axle, wheels journaled on the wheel axles, a separate stabilizing device for each end portion of each one of the wheel axles operable to prevent vertical movement of said end portions, means for normally restraining each stabilizing device against operation, fluid pressure actuated means for effecting operating of said stabilizing devices against the action of said restraining means, a source of fluid under pressure, and means for effecting application of fluid pressure from said source to the fluid pressure actuated means for the stabilizing devices.

17. Vehicle stabilizing mechanism, comprising a vehicle frame, a main axle on which the frame is supported, a pair of wheel axles positioned one on each side of the main axle, an equalizing beam on each side of the vehicle frame for pivotally connecting the end portions of the main axle to the adjacent end portions of the wheel axles, wheels journaled on the wheel axles, a separate stabilizing device for each end portion of each one of the wheel axles operable to prevent vertical movement of said end portions, means for normally restraining each stabilizing device against operation, fluid pressure actuated means for effecting operation of said stabilizing devices against the action of said restraining means, a source of fluid under pressure, and means for effecting application of fluid pressure from said source to the fluid pressure actuated means for said stabilizing devices.

18. Vehicle stabilizing mechanism, comprising a vehicle frame, a main axle on which the frame is supported, a pair of wheel axles positioned one on each side of the main axle, equalizing means for pivotally connecting the end portions of the main axle to the adjacent end portions of the wheel axles, wheels journaled on the wheel axles, a separate stabilizing device for each end portion of each one of the wheel axles operable to prevent vertical movement of said end portions, each stabilizing device including a cylinder attached to the vehicle frame to move therewith and a piston movable relative to the cylinder into and out of a position in which it prevents vertical movement of its wheel axle end portion, means for yieldably holding the pistons out of said positions, fluid pressure actuated means including said pistons and cylinders for moving the pistons into said positions, and means for effecting application of fluid pressure from said source to the fluid pressure actuated means for said stabilizing devices.

19. Vehicle stabilizing mechanism, comprising a vehicle frame, an equalizing beam pivotally mounted on each side of the frame, two wheel axles operatively connected one to the front ends and one to the rear ends of the pivoted beams, wheels for each axle, a stabilizing device for each end of each beam attached to the frame and operable to prevent upward movement of said beam ends, a brake for each wheel, and means for selectively effecting simultaneous operation of the stabilizing devices and application of the brakes or simultaneous release of the stabilizing devices and the brakes.

20. Vehicle stabilizing mechanism, comprising a vehicle frame, an equalizing beam pivotally mounted on each side of the frame, two wheel axles operatively connected one to the front ends and one to the rear ends of the pivoted beams, wheels for each axle, a stabilizing device for each end of each beam attached to the frame and operable to prevent upward movement of said beam ends, means for normally yieldably holding the stabilizing devices out of operative relation to the beam ends, and means for effecting simultaneous operation of all of said stabilizing devices against the action of their yieldable holding means.

CHARLES F. SCHOELM.